June 20, 1972  L. R. ALLEN  3,671,306
BORON CARBIDE FILM PRODUCT
Filed Nov. 28, 1969  2 Sheets-Sheet 1

United States Patent Office 3,671,306
Patented June 20, 1972

3,671,306
BORON CARBIDE FILM PRODUCT
Lloyd R. Allen, Belmont, Mass., assignor to National Research Corporation, Cambridge, Mass.
Continuation-in-part of application Ser. No. 611,191, Nov. 25, 1966, which is a continuation-in-part of application Ser. No. 524,615, Feb. 1, 1966. This application Nov. 28, 1969, Ser. No. 880,660
Int. Cl. C23c *11/02;* B44d *1/22*
U.S. Cl. 117—138.8 N                                   7 Claims

ABSTRACT OF THE DISCLOSURE

Boron carbide films produced by vacuum deposition. The films are black and shiny, amorphous and have bend tensile strength on the order of 300,000 p.s.i. and elastic modulus of 40 million p.s.i.

---

This invention relates to the production of boron carbide films and particularly to boron carbide films having unusual physical properties. This application is a continuation-in-part of S.N. 611,191 filed Nov. 25, 1966, now abandoned which is a continuation-in-part of application S.N. 524,615 filed Feb. 1, 1966, now abandoned.

BACKGROUND

Boron carbide has recently shown promise as a material for the production of structural elements due to its high strength and low weight. However, to date, satisfactory methods have not been developed for producing boron carbide under economic conditions in large areas.

OBJECTS

The principal object of the present invention is to provide a novel boron carbide product.

Another object of the invention is to provide a composite boron carbide product having unique physical and chemical properties.

Still another object of the invention is to provide a boron carbide having considerably more carbon than the stoichiometric quantity indicated in the formula $B_4C$.

Another object of the invention is to provide a boron carbide product which can be formed into strong, lightweight laminates with plastic materials such as epoxies.

GENERAL DESCRIPTION

The boron carbide product comprises a black, shiny brittle boron carbide film. This film has a thickness of at least .1 mil and has a bend tensile strength on the order of 400,000 p.s.i. and an elastic modulus in excess of 50,000,-000 p.s.i. In one species, this boron carbide has at least 30 percent carbon is free of crystallographic structure when examined by X-ray of CuKα wavelength. This boron carbide film is preferably manufactured by evaporating boron carbide from a carbon crucible at an elevated temperature in a vacuum system. The boron carbide vapors are deposited on a relatievly colder (but heated above ambient) surface positioned above the evaporating source.

In a preferred embodiment of the invention, the substrate on which the boron carbide film is deposited is one which has a density less than 5.0 gm./cc., the substrate being no more than three times as thick as the boron carbide film, the composite structure having a bend tensile strength in excess of 200,000 p.s.i. and an elastic modulus in excess of $10 \times 10^6$ p.s.i., the composite having a density less than 5.0 gm./cc. In one example, the substrate is aluminum; in another the substrate is a temperature-resistant organic film, such as the polyimide sold by the Du Pont Company under the designation Kapton.

The boron carbide film supported on the substrate may be physically incorporated in the composite structure. For certain uses, where the ultimate properties of the boron carbide are to be utilized, it may be desirable to separate the boron carbide film from the substrate. This is particularly true where the substrates are relatively thick and the composite structure to be formed must have maximum strength and stiffness per cross-section area. In either case, the boron carbide film should form a substantial portion of the total thickness of the structure so that the structure will partake of the physical properties of the boron carbide, rather than the physical properties of its support or of the matrix material.

The boron carbide film can, if desired, be separated or partially removed from the substrate, particularly when the substrate is aluminum, by dissolving the aluminum.

The boron carbide film can be broken into flakes; these flakes then can be embodied in a composite structure, such as an epoxy resin. Alternatively the boron carbide film may be deposited on a cold metal sheet (e.g. tungsten) which is then flexed to cause the boron carbide film to fall off the metal sheet in the form of flakes.

Other objects, features and advantages of the invention will in part be obvious from this disclosure and will in part appear below.

SPECIFIC DESCRIPTION, DRAWINGS

The invention is now specifically described in conjunction with the following drawings wherein.

Figure 1:
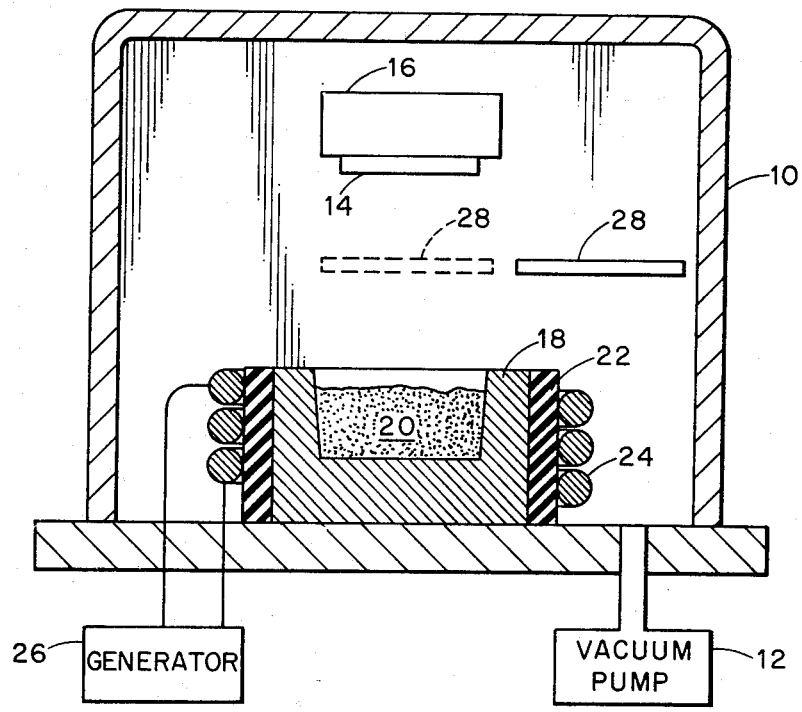
FIG. 1 is a drawing of induction heating apparatus for use in practicing the coating process.

Reference should be made to FIG. 1 which is a diagrammatic, schematic, representation of one apparatus suitable for practicing the invention. In this apparatus, there is preferably provided a vacuum chamber indicated at 10, arranged to be suitable evacuated by vacuum pump 12. The substrate to be coated is shown at 14 as being supported by a heating platen 16, the substrate being positioned over a crucible 18 containing a charge of boron carbide 20. Surrounding the crucible 18 is a layer of insulation 22 and an induction coil 24 operated from a generator 26. Between the substrate and the top of the crucible is provided a shutter 28 (as shown in the retracted position) the vapor intercepting position of the shutter being shown in dotted lines. In operation the chamber is pumped down to a relatively high vacuum after the elements shown have been mounted in the vacuum chamber. The source is heated up to outgas the source and when operating temperature has been obtained the shutter is moved aside to permit coating of the substrate 14.

For a detailed example of the production of a boron carbide film utilizing the general type of apparatus schematically indicated in FIG. 1, reference should be had to the following non-limiting specific examples:

Example 1

The evaporation source consisted of a graphite crucible 1¾ inches I.D. 2½ inches O.D. 3 inches tall made of AP-70 grade graphite and obtained from Carbone. This crucible was mounted on a rod ¼ inch in diameter 6 inches long, the bottom end of the rod being supported in a firebrick. Surrounding the crucible was 1 inch of fibrous carbon obtained from Barnaby-Cheney grade 4C-2. Outside of the carbon insulation was an induction coil connected to an 8600 c.p.s. generator. The crucible was charged with 100 grams of extra pure grade boron carbide obtained from Norton Company. This crucible was positioned 14 inches below an aluminum substrate mounted on a heating platen. A shutter was positioned between the substrate and the source. The chamber containing the above source and substrate was evacuated to a $10^{-5}$ torr and thereafter the source was gradually heated to about 1500° C. for 10 minutes. When the source had been completely outgassed, the temperature was raised to 2300° C. At the same time the temperature of the substrate was raised to 150° C. by heating the platen to 160° C. Thereafter the shutter was moved aside and the substrate was coated with boron carbide for 20 minutes. The vacuum in the coating chamber was released, the substrate was removed and examined. There were approximately 2.5 mils of boron carbide on the substrate indicating a deposition rate of 0.125 mil per minute. The temperature of the substrate was measured during coating by means of an Iron Constantan thermocouple and the temperature of the boron carbide source as measured by optical pyrometer. The substrate was then tested as follows:

First, the aluminum substrate was removed by alkali etching and the resulting boron carbide was subjected to bend tensile testing. It had an elastic modulus of $62 \times 10^6$ and a bend tensile strength of 410,000 p.s.i. It was analyzed chemically and found to have 40% carbon. The deposit was black, shiny and brittle and appeared to be amorphous, continuous, free of pin holes and essentially uniform. It was subjected to X-ray beam heated source rather than an induction heated source. In electron beam evaporation it is important to degas the boron carbide by preheating in vacuum ($10^{-3}$ torr or less) at 1300° C. for an hour prior to evaporation; this substantially prevents spitting from the melt during the electron beam evaporation. This product can be in the form of continuous film, flakes, or filaments cut from a larger film. Preferably the boron carbide film has a thickness on the order of 1 mil for use in generally rigid form; this thickness will depend upon its ultimate use. When using the boron carbide in its coating form for laying up into complex shapes it is distinctly advantageous to hold the total boron carbide thickness between 0.1 and 1.0 mil and especially from 0.2 to 0.3 mil per side on a two side coated substrate. This arrangement provides sufficient flexibility for the coated substrate as a whole to allow laying up into a wide variety of structural shapes.

In induction heating the entire charge of the crucible is melted and vigorously circulated by the heating to insure uniformity of temperature and homogenity of composition of the charge. The excess carbon causes the charge to evaporate at a higher rate at a given temperature (although carbon per se would not evaporate, but would sublime from a solid). The excess carbon also appears to improve adhesion and ductility of the boron carbide coating thus allowing greater thickness and higher effective stiffness in the coated product.

It has been observed that plate and carrying a heat exchange fluid and heat exchanger (not shown) outside the vacuum chamber. Additional thermal control means are provided in the form of a series of radiant heater rods 32 disposed to preheat the film 22 as it moves toward a zone above the crucible 12 for receiving boron carbide vapors which deposit and condense on the film. A shutter 34 is movable into a position as shown in the drawing for allowing deposition or to a position above crucible 2 to prevent deposition. Guide-rollers 36 and other conventional accessories of vacuum coating e.g. temperature and pressure monitors, deposition rate monitors, foil tension controls, etc. should of course also be provided.

Figure 2:
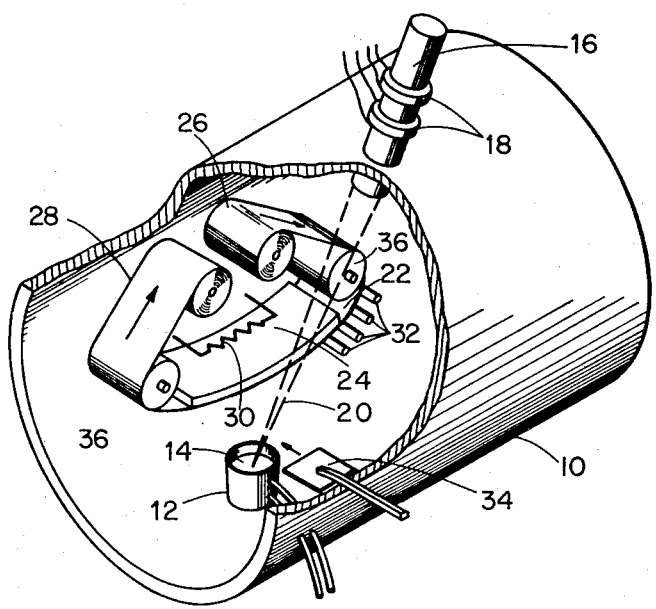
FIG. 2 is a drawing of electron beam heating apparatus for use in practicing the coating process.
Figure 3:
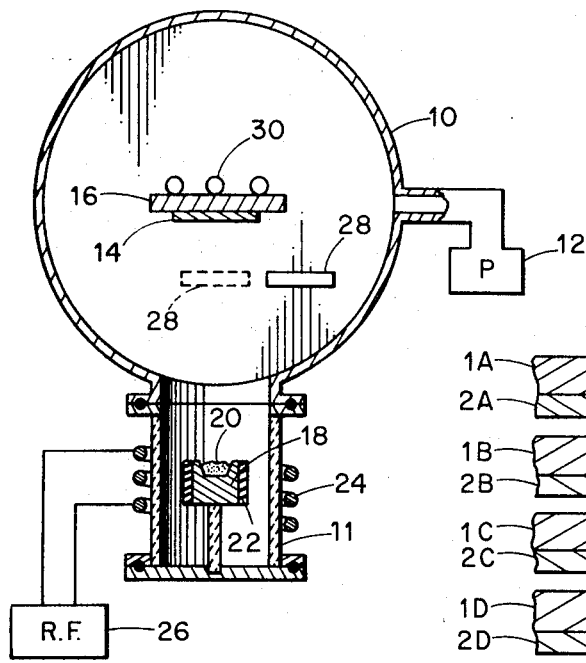
FIG. 3 is a drawing of a second induction heating apparatus for use in practicing the coating process.

Referring now to FIG. 3 there is shown another form of induction heated coating apparatus comprising a cylindrical vacuum chamber 10 similar to the chamber 10 of FIG. 2 pumped by high vacuum pumping means 12 (diffusion pump with cold trap and forepump). A substrate foil (film) 14 to be coated is passed over a back-up plate 16 to which is brazed heat exchange coils 30.

A graphite crucible 18 holds a boron carbide charge 20, is surrounded by insulation 22 and is heated by an induction coil 24 located outside the vacuum powered by a radio frequency generator 26. The crucible is supported on thin graphite legs in a tubular quartz extension 11 of the vacuum chamber 10.

In order to insure that the deposited boron carbide will contain carbon in excess of stoichiometric proportion and in the range of 30-50%, it is desirable to add carbon to the crucible during coating. This can be accomplished through use of a lance or pellet feeder (not shown). The molten boron carbide (with carbon added) will also consume carbon from the crucible at the elevated melting temperature, but crucible life is long enough for practical production purposes.

Figure 5:
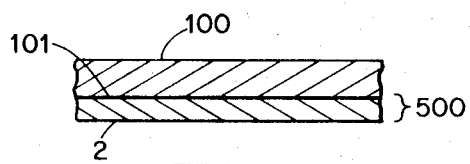
FIGS. 5–5B and 6 illustrate other forms of repeating coated product for use in laminate construction, and FIG. 7 indicates a hybrid form of laminate with additional high strength reinforcement supplementing the basic high stiffness boron carbide reinforcement.
Figure 5A:
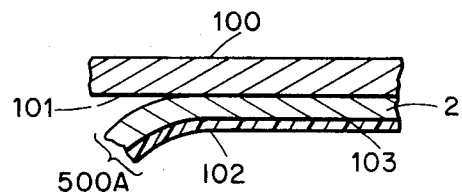
Figure 5B:
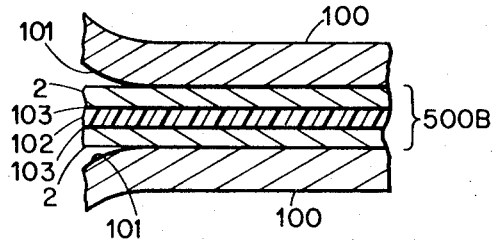

FIGS. 5-5B illustrates another group of methods of utilizing the invention. Referring to FIG. 5, a substrate 100 of 2 mil aluminum foil is coated with a layer of parting agent, 101, capable of withstanding the high temperatures of boron carbide coating, such as potassium chloride salt. A layer of boron carbide 2 is deposited and can be later stripped to form a repeating unit 500 of a laminate. In FIG. 5A, a thin foil or film 102 such as ¼ mil polyimide film is adhered to the coating 2 via an adhesive 103 and when stripped away from the parting agent coated substrate 100, the repeating unit 500A for lamination is the plastic film 102 coated with boron carbide film 2. In FIG. 5B two coated products 2/100 are adhered to a foil 102 via adhesive 103 and then the substrates 100 are peeled back to leave a repeating unit 500B for purposes of lamination.

Figure 4:
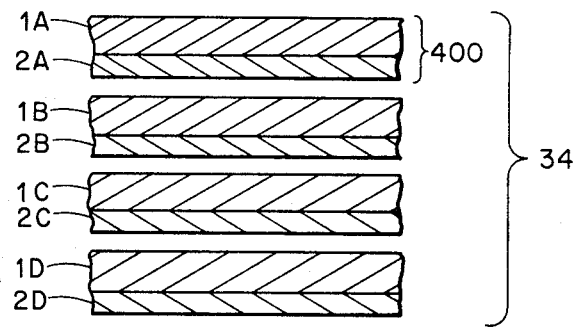
FIG. 4 is a schematic cross-section of repeating units of a coated product for lay-up into a laminate.

Referring now to FIG. 4 there is shown a series of repeating coated products 400, which are to be laid up into a laminate 4. Each repeating unit comprises a substrate 1A, 1B, etc. of aluminum foil of about 0.7 mil thickness coated with about 0.5 mil thickness of boron carbide 2A, 2B, etc. Each unit is painted with epoxy adhesive on both sides and the units are stacked and pressed heated to cure the adhesive and form the rigid laminate.

Alternatively the laminate may be self bonded by hot pressing to achieve bonding at the aluminum-boron interfaces.

Figure 6:
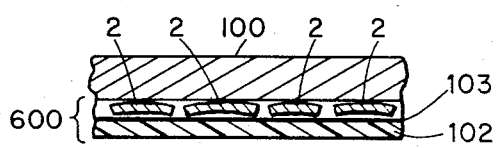

In FIG. 6 the substrate 100 is coated cold and may be a metal such as titanium. This causes the boron carbide coating 2 to deposit in the form of removable flakes which are later picked off as a flake layer by a plastic film 102 coated with an adhesive layer 103.

Figure 7:
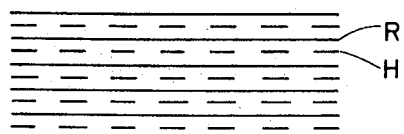

FIG. 7 schematically shows a hybrid laminate with alternate layers of reinforcement R and hybrid layers H. In laminates where very high strength is desired in addition to high stiffness, the hybrid layers H can comprise boron or carbon filament reinforced tapes, alloy steel, sheet or the like. The stiff reinforcing layer R can comprise any of the basic laminating elements described above comprising a boron carbide film or an original or transfer substrate directly or indirectly coated with boron carbide, or a laminate per se.

Since certain changes can be made in the above process and without departing from the scope of the invention herein involved, it is intended that all matter contained in the above description shall be interpreted as illustrative and not in a limiting sense.

What is claimed is:

1. An article of manufacture comprising a continuous polymeric substrate film having a density less than 5.0 gms./cc. and having deposited thereon a black, shiny, brittle boron carbide film having a thickness of from 0.1 to 1.0 mil, a bend tensile strength of at least about 300,000 p.s.i., an elastic modulus in excess of 40,000 p.s.i. and lacking crystallographic structure under X-ray analysis thereof at CuK$\alpha$ wavelength, said polymeric substrate film having a thickness of no more than about three times the thickness of said boron carbide film.

2. The article of claim 1 wherein the boron carbide/polymeric film substrate composite structure has a bend tensile strength in excess of 200,000 p.s.i., a density less than 5.0 gms./cc. and an elastic modulus in excess of $10 \times 10^6$ p.s.i.

3. The article of claim 1 wherein the polymeric substrate film is a polyimide.

4. The article of claim 1 wherein the boron carbide/polymeric film substrate composite structure has a bend tensile strength in excess of 300,000 p.s.i. and an elastic modulus in excess of $40 \times 10^6$ p.s.i.

5. The composite article of claim 1 wherein said boron carbide film of from 0.2 to 0.3 mil thickness is deposited on each of two surfaces of said polymeric substrate film.

6. The article of claim 1 wherein the boron carbide film has a stoichiometric $B_4C$ composition for maximum strength.

7. The article of claim 1 wherein the boron carbide film has at least 30-50 atomic percent carbon for maximum modulus of elasticity.

References Cited

UNITED STATES PATENTS

| | | | |
|---|---|---|---|
| 3,579,415 | 5/1971 | Allen et al. | 161—182 X |
| 3,178,508 | 4/1965 | Oxley et al. | 117—106 C |
| 3,374,102 | 3/1968 | Wainer et al. | 23—208 AX |
| 3,334,967 | 8/1967 | Bourdeau | 23—208 A |

OTHER REFERENCES

Powell et al., Vapor Deposition, John Wiley & Sons, Inc., New York, 1966, p. 680.

ALFRED L. LEAVITT, Primary Examiner

K. P. GLYNN, Assistant Examiner

U.S. Cl. X.R.

23—208 A; 117—106 C, 138.8 R, DIGEST 10; 264—60